United States Patent
Andler et al.

(10) Patent No.: US 10,800,205 B2
(45) Date of Patent: Oct. 13, 2020

(54) HUB FOR HEAVY-DUTY VEHICLE

(71) Applicant: Hendrickson USA, L.L.C., Itasca, IL (US)

(72) Inventors: Jason Andler, Canal Fulton, OH (US); Dane Gregg, Uniontown, OH (US); Keith Ernenwein, North Canton, OH (US); Jeff Wittlinger, Uniontown, OH (US); Sri Satya Teja Kakarla, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 464 days.

(21) Appl. No.: 15/825,157

(22) Filed: Nov. 29, 2017

(65) Prior Publication Data

US 2018/0154691 A1    Jun. 7, 2018

Related U.S. Application Data

(60) Provisional application No. 62/430,057, filed on Dec. 5, 2016.

(51) Int. Cl.
*B60B 27/02* (2006.01)
*B60B 27/00* (2006.01)

(52) U.S. Cl.
CPC ........ *B60B 27/0094* (2013.01); *B60B 27/001* (2013.01); *B60B 27/0005* (2013.01);
(Continued)

(58) Field of Classification Search
CPC . B60B 27/00; B60B 27/0052; B60B 27/0005; B60B 27/001; B60B 27/02; B60B 27/0094; B60B 27/0047; B60B 27/023
See application file for complete search history.

(56) References Cited

U.S. PATENT DOCUMENTS 3,049,928 A * 8/1962 Boughner ............... F16H 37/00
74/13
5,757,084 A    5/1998 Wagner
(Continued)

FOREIGN PATENT DOCUMENTS

CN    102582358 A    7/2012
CN    202863030 U    4/2013
(Continued)

*Primary Examiner* — Scott A Browne
(74) *Attorney, Agent, or Firm* — Dureska & Moore, LLC; David P. Dureska; Greg Strugalski

(57) ABSTRACT

A hub for a heavy-duty vehicle and for mounting a wheel for relative rotation comprises a substantially cylindrical body having axially opposite end portions and a longitudinal central axis. Each of a pair of bearing receiving bores is formed in the cylindrical body at a respective axially opposite end portion of the cylindrical body. A circumferential envelope has an outer diameter and is formed on the cylindrical body about one of the pair of bearing receiving bores. A flange extends radially outward from the cylindrical body at a location between the pair of bearing receiving bores. A barrel portion of the cylindrical body extends between the flange and the circumferential envelope and has an outer diameter. The hub provides sufficient strength and minimizes weight by incorporating specific longitudinal profiles and ratios and/or relationships of various dimensions of the barrel portion 104.

30 Claims, 7 Drawing Sheets

(52) U.S. Cl.
CPC .......... *B60B 27/0047* (2013.01); *B60B 27/02* (2013.01); *B60B 27/023* (2013.01); *B60B 2310/202* (2013.01); *B60B 2360/104* (2013.01); *B60B 2900/111* (2013.01); *B60B 2900/112* (2013.01); *B60B 2900/561* (2013.01); *Y02T 10/86* (2013.01)

(56) References Cited

U.S. PATENT DOCUMENTS

| | | |
|---|---|---|
| 7,393,064 B2 | 7/2008 | Hall et al. |
| 7,585,031 B2 | 9/2009 | White et al. |
| 8,287,052 B2 | 10/2012 | Fakhoury et al. |
| 8,950,556 B2 | 2/2015 | Root |
| 2007/0052282 A1 | 3/2007 | White |
| 2007/0052283 A1 | 3/2007 | White |
| 2011/0156475 A1* | 6/2011 | Fakhoury ................ B60B 27/02 301/105.1 |
| 2016/0136996 A1* | 5/2016 | Sweeting ............. B60B 27/023 301/61 |
| 2016/0236511 A1* | 8/2016 | Fakhoury ............. F16C 19/548 |

FOREIGN PATENT DOCUMENTS

| | | |
|---|---|---|
| EP | 0733494 A2 | 9/1996 |
| WO | 1997042425 | 11/1997 |
| WO | 2005092639 A1 | 10/2005 |

\* cited by examiner

INBOARD DIRECTION

HUB FOR HEAVY-DUTY VEHICLE

CROSS-REFERENCE TO RELATED APPLICATION

This application claims the benefit of U.S. Provisional Patent Application Ser. No. 62/430,057 filed Dec. 5, 2016.

TECHNICAL FIELD

The subject matter of this application generally relates to wheel end assemblies for vehicles. Particularly, the subject matter relates to a wheel end assembly having an improved hub for use with heavy-duty vehicles.

BACKGROUND

Heavy-duty vehicles, such as trucks, tractor-trailers or trailers and the like, typically utilize a pair of wheel end assemblies attached to respective opposite ends of an axle. Multiple axle and wheel end assemblies may be used on a heavy-duty vehicle. Each wheel end assembly typically includes a hub, also referred to as a wheel hub, that is supported on a spindle of an axle for relative rotation by a bearing assembly. The bearing assembly includes an inboard bearing and an outboard bearing, which may be separated by a bearing spacer. The spindle has an attachment end portion, or skirt, with an outer diameter that is substantially equal to an outer diameter of an end portion of an axle central tube to which the spindle will be attached.

A spindle nut assembly is threaded onto threads formed on an outboard end of the spindle to secure the bearing assembly and hub on the spindle. The spindle nut assembly typically includes an inboard nut, a lock washer, an outboard nut, and a set screw, as is known. In addition to retaining the position of the bearings and any spacer, the spindle nut assembly may provide a clamping force for a desired axial preload to the bearings, and any bearing spacer, to a predetermined level. For normal operation of the wheel end assembly to occur, the bearings are lubricated with grease or oil from a lubrication chamber that contains a relatively large quantity of expensive lubrication material.

In many heavy-duty vehicle wheel end assembly configurations, a brake drum of a brake assembly and a wheel rim are mounted on the hub. In order to facilitate correct mounting and alignment of the brake drum and wheel rim the hub is formed with a flange that includes a precise mounting surface. Mounting studs are attached to the flange. The brake drum and the wheel rim are formed with openings that slide over the mounting studs, that enable the drum and wheel rim to be fastened and clamped against the mounting surface of the hub flange.

While most wheel end assemblies include these general features, the design and arrangement of the hub and other components may vary according to the specific vehicle design and its anticipated uses. Moreover, the design and construction of prior art hubs exhibit limitations in hub formation, which lead to disadvantages, such as having a relatively large volume cavity for expensive lubrication material to occupy and a barrel having an outer diameter of at least 6.5 inches, with undesirable relatively heavy weight, using relatively large quantities of materials for construction and associated relatively high cost of manufacture.

Many known heavy-duty vehicle hubs typically are made by casting a cylindrical shape from aluminum or a ferrous material, such as iron. The cast shape is then machined to precisely form critical surfaces that keep the inboard and outboard bearings, the seals, and the mounting surface in precise alignment relative to the spindle. In the prior art, most heavy-duty vehicle hubs have been cast due to the strength that is required of the hub and the complex profile or configuration of the hub.

Cast materials, iron in particular, that is needed to withstand the operating loads that the hub will experience often result in relatively thick walls of the hub which yield an undesirably heavy hub. Such relatively heavy weight of the hub increases fuel consumption of the heavy-duty vehicle and decreases the load that the heavy-duty vehicle may carry and thereby undesirably increases the cost of vehicle operation. Furthermore, some casting designs include one or two thick portions serving as gates to provide better material fill during the casting process and add weight to the hub. The gates typically extend axially only for a portion of the length of the cavity. It is, therefore, desirable to provide a hub that is as light it can possibly be and meet all requirements for operation on a heavy-duty vehicle.

Because heavy-duty vehicle hubs experience significant operational loads, increased fatigue strength is an important property, which must be balanced against the desire to minimize the weight of the hub. It is desirable to achieve as much fatigue strength in a hub as is economically feasible and/or to optimize the strength-to-weight ratio of the hub. Metals that are readily cast, such as ductile iron, aluminum and certain grades of steel, often have limited strength. As a result, in order to increase the strength of the hub, portions of the hub are relatively thick so the weight and associated cost of the hub is often undesirably increased. For this reason, it is desirable to develop a hub construction that employs materials and structure which provide increased strength or other desirable properties, while reducing hub weight and cost.

The disadvantages, drawbacks and limitations associated with some previously known hubs make it desirable to develop an improved hub construction that is relatively light in weight and that can withstand stress and strain during operation of the heavy-duty vehicle, especially when carrying a relatively heavy load.

SUMMARY

A summary is provided to introduce concepts in a form that are described in detail below. This summary is not intended to identify key factors or essential features of the concepts, nor is it intended to limit the scope of the concepts.

The disadvantages, drawbacks and limitations associated with previously known hubs are overcome with a hub constructed and manufactured according to the concepts described herein. The concepts provide a relatively lighter weight hub that can withstand stress concentrations encountered during operation of a heavy-duty vehicle and reduce material use and cost. This is accomplished with an improved hub structure that is relatively light, has a relatively thin barrel portion of the hub with a specific longitudinal transition profile blending into a flange portion of the hub, has pilots spaced from the barrel portion and contains a relatively small quantity of expensive lubricant.

An improved hub, according to one aspect, is intended for use in a wheel end assembly of a heavy-duty vehicle that receives and mounts a wheel for rotation. The hub includes a substantially cylindrical body having axially opposite end portions and a longitudinal central axis. The cylindrical body defines a lubrication chamber. A pair of bearing receiving bores is formed in the cylindrical body. Each one of the pair of bearing receiving bores is located at a respective axially opposite end portion of the cylindrical body. A flange extends radially outward from the cylindrical body at a location between the pair of bearing receiving bores in the cylindrical body. A barrel portion of the cylindrical body extends between the flange and one of the pair of bearing receiving bores. The barrel portion has an outer diameter. A plurality of circumferentially spaced mounting pilots is spaced from the barrel portion of the cylindrical body. A reservoir channel is formed in the cylindrical body extending from the lubrication chamber and at least partially located radially inward of the flange. The reservoir channel has an inner diameter greater than an outer diameter of the barrel portion of the cylindrical body.

A first transition segment may be located between the flange and the cylindrical body. The first transition segment extends in a direction toward a first axial end of the cylindrical body. A second transition segment may be located between the flange and the cylindrical body. The second transition segment extends in a direction toward an opposite second axial end of the cylindrical body. At least one of the first and second transition segments has a profile taken in a plane extending radially from the longitudinal central axis of the cylindrical body. The profile includes at least one arcuate portion and at least one straight portion. Both of the first and second transition segments may have profiles including at least one arcuate portion and at least one straight portion. At least one of the first and second transition segments includes at least two arcuate portions and at least one straight portion in which at least one straight portion is located between arcuate portions.

At least one of the first and second transition segments includes an arcuate first transition portion extending from the cylindrical body in a direction from a first end portion of the cylindrical body and having a radius in a range from about 1.9 inches to about 2.1 inches and a straight second transition portion extending from the first transition portion at an angle in a range from about 30° to about 36° relative to the longitudinal central axis A of the cylindrical body for a distance in a range from about 0.30 inch to about 0.39 inch. At least one of the first and second transition segments includes an arcuate first transition portion extending from the cylindrical body in a direction from an opposite second end portion of the cylindrical body the cylindrical body and having a radius in a range from about 0.90 inch to about 1.10 inches and a straight second transition portion extending from the first transition portion at an angle in a range from about 40° to about 50° relative to the longitudinal central axis A of the cylindrical body for a distance in a range from about 0.48 inch to about 0.58 inch.

A relief extends axially and is located adjacent the flange and one of the first and second transition segments. A reservoir channel is formed in the cylindrical body extending from a lubrication chamber and at least partially located radially inward of the flange. The reservoir channel has a diameter greater than the outer diameter of the barrel.

A plurality of axially extending and circumferentially spaced mounting pilots is located adjacent one of the first and second transition segments and the flange. Each of the mounting pilots has a relief extending axially into the flange and being located adjacent the intersection of the flange and the mounting pilot. A circumferential envelope is located around a bearing receiving bore and has an envelope thickness.

The barrel of the cylindrical body has a barrel thickness over its entire axial length wherein the envelope thickness is substantially the same as the barrel thickness. A circumferential envelope is located around a bearing receiving bore portion and has an envelope diameter. The barrel has a barrel diameter and extends between the flange and the circumferential envelope. The barrel of the cylindrical body has a thickness wherein a ratio of envelope diameter or barrel diameter to the thickness of the barrel is in a range from about 11 to about 34. The cylindrical body has a rib with a thickness. A ratio of outer diameter of the barrel to the thickness of the barrel is in a range from about 8 to about 20.

DRAWINGS

The following description and drawings set forth at least one illustrative aspect or implementation of the disclosed subject matter. These are indicative of but a few of the various ways in which one or more aspects or implementations may be employed. Further features of the disclosed subject matter will become apparent to those skilled in the art from reading the following description with reference to the accompanying drawings, in which.

DESCRIPTION

Figure 1:
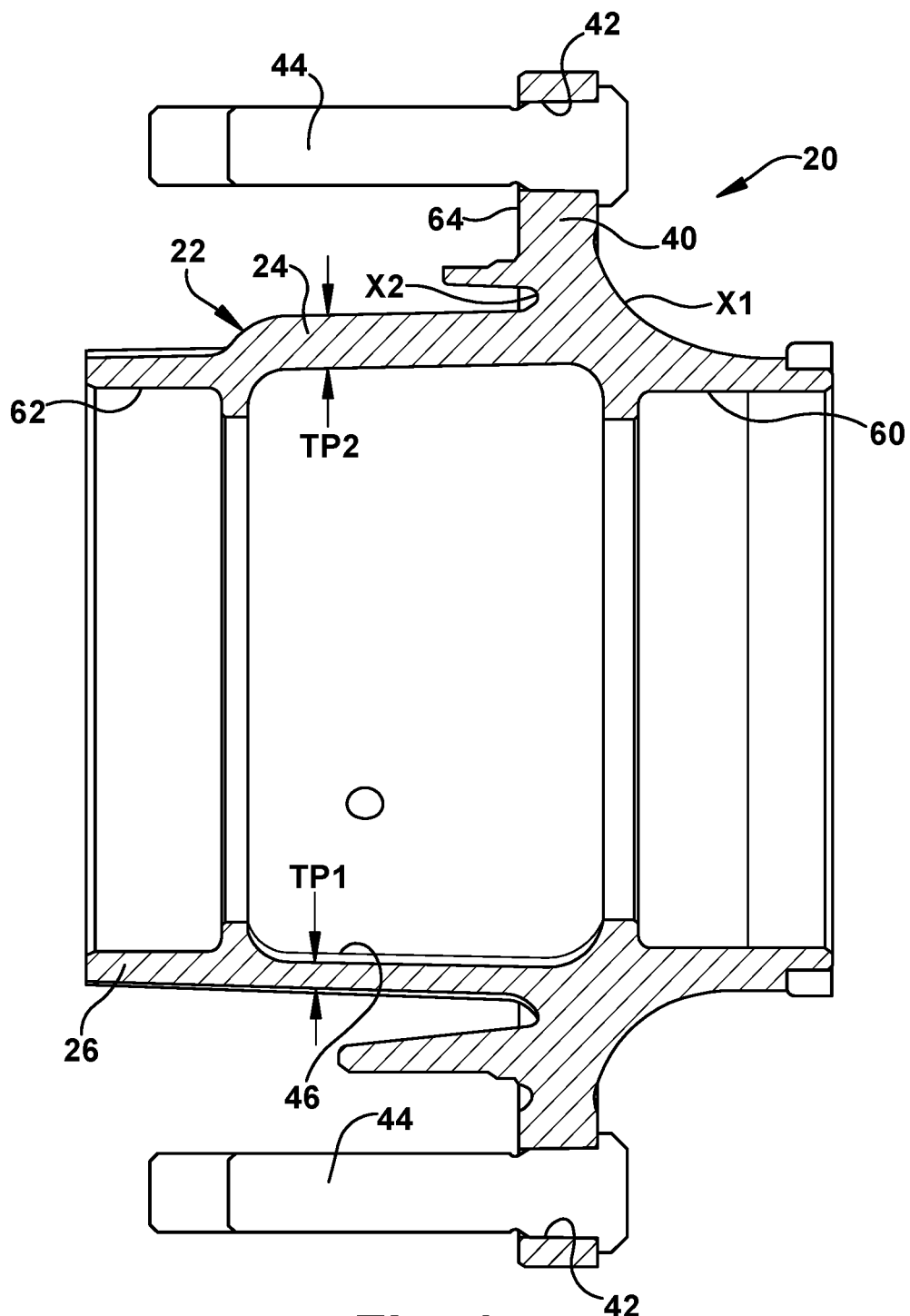
FIG. 1 is a cross-sectional view of a prior art hub having a relatively thick barrel portion.
Figure 2:
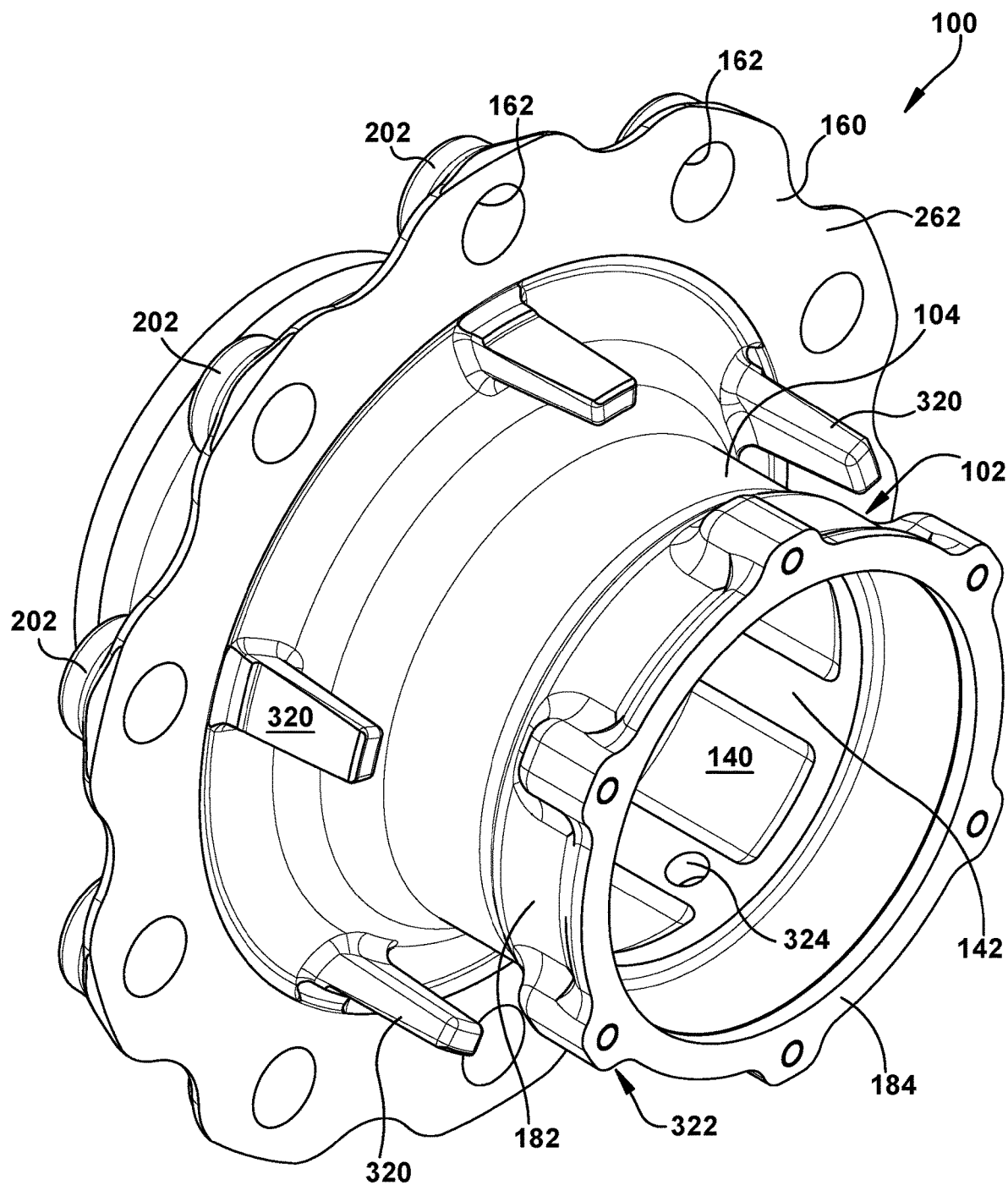
FIG. 2 is an overall perspective view of the hub constructed according to one aspect of the disclosed subject matter and having a relatively thin barrel portion.

The disclosed subject matter is described with reference to the drawings, in which like reference numerals are used to refer to like elements throughout the description and drawings. For exemplary purposes, details are set forth in at least one aspect to provide an understanding of the disclosed subject matter. It will be understood, however, that the disclosed subject matter can be practiced and implemented without these specific details.

To better understand the hub according to one aspect of the disclosed subject matter, a prior art hub 20 for a heavy-duty vehicle is shown in FIG. 1 and described. The hub 20 is for mounting on inboard and outboard bearings (not shown) for rotation relative to an axle spindle (not shown) in a known manner. The hub 20 has a body 22 with a relatively thick barrel wall 24 and indicated by respective thicknesses TP1 and TP2. A hubcap (not shown) may be mounted on an end portion 26 of the hub 20 in a known manner. A flange 40 extends radially outward from the body 22 of the hub 20. Openings 42 are formed in the flange 40 of the hub 20. Each of the openings 42 receives a respective wheel mounting stud 44 as is known. A brake drum (not shown and a tire and wheel assembly (not shown) are mounted on the flange 40 and retained by threading and tightening nuts (not shown) onto the wheel mounting studs 44.

For lubrication of the inboard and outboard bearings, a suitable amount of lubricant (not shown) is introduced into a cavity 46 formed in the body 22 of the hub 20. The prior art hub 20 typically is formed as a casting. Critical surfaces are machined to relatively tight tolerances on the hub 20, and include an inboard bearing receiving bore 60, an outboard bearing receiving bore 62 and a mounting surface 64 of the flange 40.

The hub 20 is typically cast from ductile iron and then machined. The prior art hub 20 has a relatively rapid section modulus change at the interface region X1 or X2 between mounting flange 40 and body 22. Such a rapid section modulus change at this interface generally reduces the fatigue strength of prior art hub 20. To accommodate the rapid section modulus change, the walls of the barrel 24 of the body 22 are formed to have relatively large thicknesses TP1 and TP2 and render the hub 20 relatively heavy.

Such casting, machining and rapid section modulus change leads to disadvantages, drawbacks and limitations associated with the use of a relatively large amount of material causing relatively heavy weight of the hub 20. Such disadvantages, drawbacks and limitations of the prior art hub 20 make it desirable to develop a hub that is lighter in weight, more economical to manufacture and exhibits good physical properties. The concepts presented by the disclosed subject matter satisfy this desire.

Turning to FIGS. 2-6, an exemplary aspect of a one-piece integrally cast hub for a heavy-duty vehicle is indicated generally by the reference numeral 100. The use of, and reference to, the term "heavy-duty vehicle" is for the purpose of convenience and intended to include trucks, trailers and tractor-trailers or semi-trailers and the like.

Figure 4:
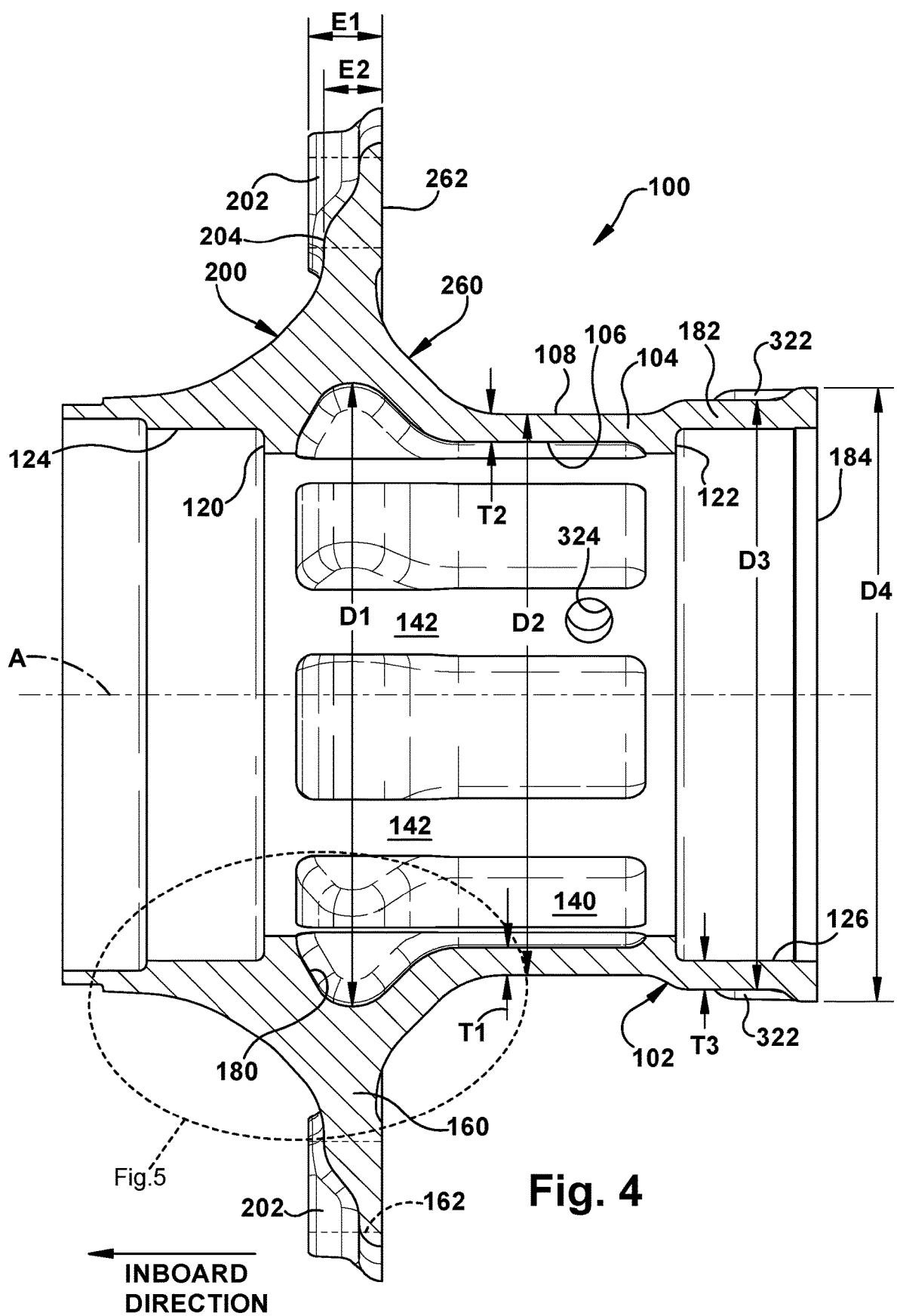
FIG. 4 is an enlarged cross-sectional side view of the hub illustrated in FIG. 2.

The hub 100 is to be operatively mounted on inboard and outboard bearings (not shown) for rotation relative to an axle spindle (not shown) in a known manner. The hub 100 is relatively smaller in size than prior art hubs 20 and has a substantially cylindrical body 102. The hub 100 also has a barrel portion or barrel 104 located intermediate axially opposite ends of the cylindrical body 102. The barrel portion 104 is made with a relatively thin wall as indicated by respective thicknesses T1 and T2 (FIG. 4). The barrel portion 104 extends substantially concentric with a longitudinal central axis A of the cylindrical body 102 of the hub 100. The barrel portion 104 has respective thicknesses T1, T2 that are continuous and substantially the same over their axial extent.

It is desirable for the hub 100 to be as light as possible, yet strong enough to withstand the forces it encounters during operation of the heavy-duty vehicle. This is referred to as optimization of the strength-to-weight ratio of the hub 100. In order to optimize the strength-to-weight ratio of the cast hub 100, an innovative hub structure manufactured in accordance with an aspect of the disclosed subject matter is provided.

The hub 100 is integrally cast as one piece. The hub 100 may be cast from any suitable material for its intended application, such as ductile iron, austempered ductile iron (ADI) or an economically castable grade of steel. The hub 100 may be cast with an internal sand core and/or an external sand core. If internal and external sand cores are used, care must be taken to precisely position the cores relative to one another to yield a quality hub 100.

The barrel portion 104 of the cylindrical body 102 is defined, at least partially, by a cylindrical inner wall surface 106 and a cylindrical outer wall surface 108. The cylindrical inner wall surface 106 and the cylindrical outer wall surface 108 preferably extend substantially parallel to, and concentric with, one another. The cylindrical inner wall surface 106 is preferably substantially parallel to the longitudinal central axis A of the cylindrical body 102 of the hub 100. The cylindrical inner wall surface 106 is preferably of the same diameter over its entire axial extent between annular shoulders 120 and 122. The outer wall surface 108 may be circular and smooth to better distribute stresses in the barrel portion 104 as the hub 100 rotates under load during use.

An inboard bearing receiving bore 124 and an outboard bearing receiving bore 126 are formed in the cylindrical body 102. Each of the bearing receiving bores 124, 126 is located in a respective axially opposite end portion of the cylindrical body 102. Both of the bearing receiving bores 124 and 126 have a diameter in the range from about 5.4375 inches to about 5.7864 inches. It should be apparent that the cylindrical inner wall surface 106 and the cylindrical outer wall surface 108 may each or both extend at an angle relative the longitudinal central axis A and the cylindrical inner wall surface and the cylindrical outer wall surface may extend at something other than parallel substantially to one another.

The cylindrical inner wall surface 106 of the barrel 104 has a diameter of about 5.25 inches. The barrel 104 has a thickness T1, T2 in between the cylindrical inner wall surface 106 and the cylindrical outer wall surface 108 that is the same over essentially the entire axial extent of the barrel. The cylindrical outer wall surface 108 of the barrel 104 has a diameter D2 of about 6.10 inches.

A lubrication chamber 140 is formed in the cylindrical body 102 of the hub 100. The lubrication chamber 140 receives a suitable lubricant, such as grease or oil, to provide lubrication to the bearings that support the hub 100, as is known. Since the overall size of the hub 100 is relatively small, the lubrication chamber is relatively small and contains less quantity of the relatively expensive lubrication material.

The cylindrical body 102 may have a plurality of axially extending reinforcing ribs 142 within the lubrication chamber 140 of substantially equal thicknesses. The cylindrical body 102 preferably has at least three reinforcing ribs 142 (seven reinforcing ribs are used in the exemplary aspect) that are equally circumferentially spaced to provide strength in the hub 100. The thickness T1 of the barrel portion 104 where no reinforcing ribs are located may be in the range of about 0.19 inch to about 0.53 inch and preferably in the range of about 0.25 inch to about 0.35 inch. The thickness T2 of the barrel portion 104 where reinforcing ribs 142 are located may be in the range of about 0.31 inch to about 0.63 inch and preferably in the range of about 0.41 inch to about 0.49 inch. It should be apparent that the reinforcing ribs 142 may or may not be employed in the hub 100 and is dependent upon factors such as the intended use, the materials selected for casting and the required performance properties and characteristics of the hub. The reinforcing ribs 142 not only serve to strengthen the cylindrical body 102 but may act to distribute or force lubrication from the lubrication chamber 140 and/or in a direction toward at least one of the bearing receiving bores 124, 126. The reinforcing ribs 142 may have any suitable width and shape taken in a circumferential direction. The reinforcing ribs 142 may also have a radial inward facing surface with a profile or projection to enhance the distribution of lubrication.

A flange 160 extends radially outward from the cylindrical body 102 of the hub 100. The flange 160 extends substantially perpendicular to the longitudinal central axis A of the hub 100. The flange 160 is located entirely between the bearing receiving bores 124, 126 in the cylindrical body 102 of the hub 100. The flange 160 and cylindrical body 102 are integrally cast as one-piece. The flange 160 is machined to provide an outboard flat mounting surface 262 that extends perpendicular to the longitudinal central axis A of the hub 100.

Figure 3:
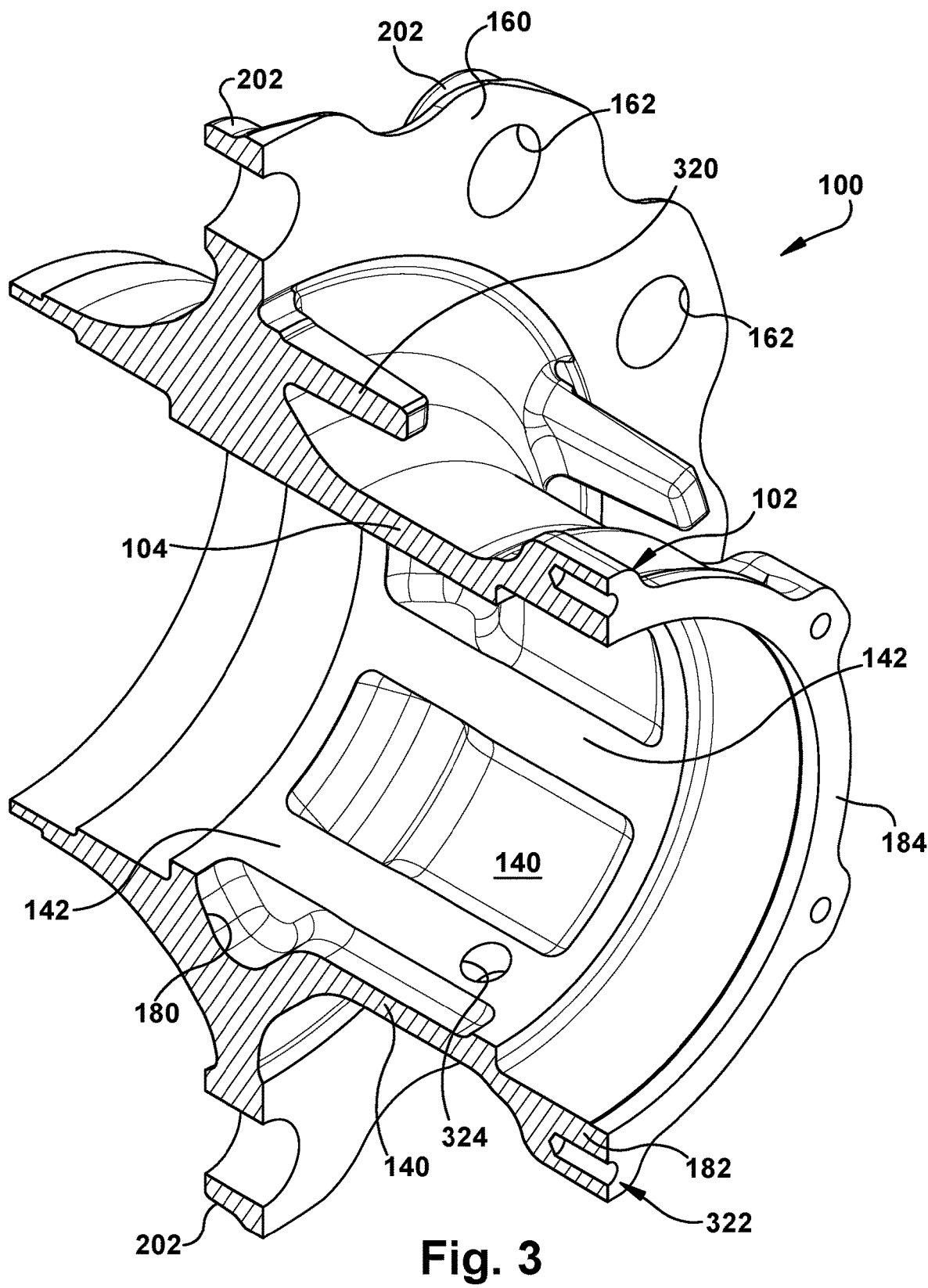
FIG. 3 is a perspective sectional view of the hub illustrated in FIG. 2.
Figure 7:
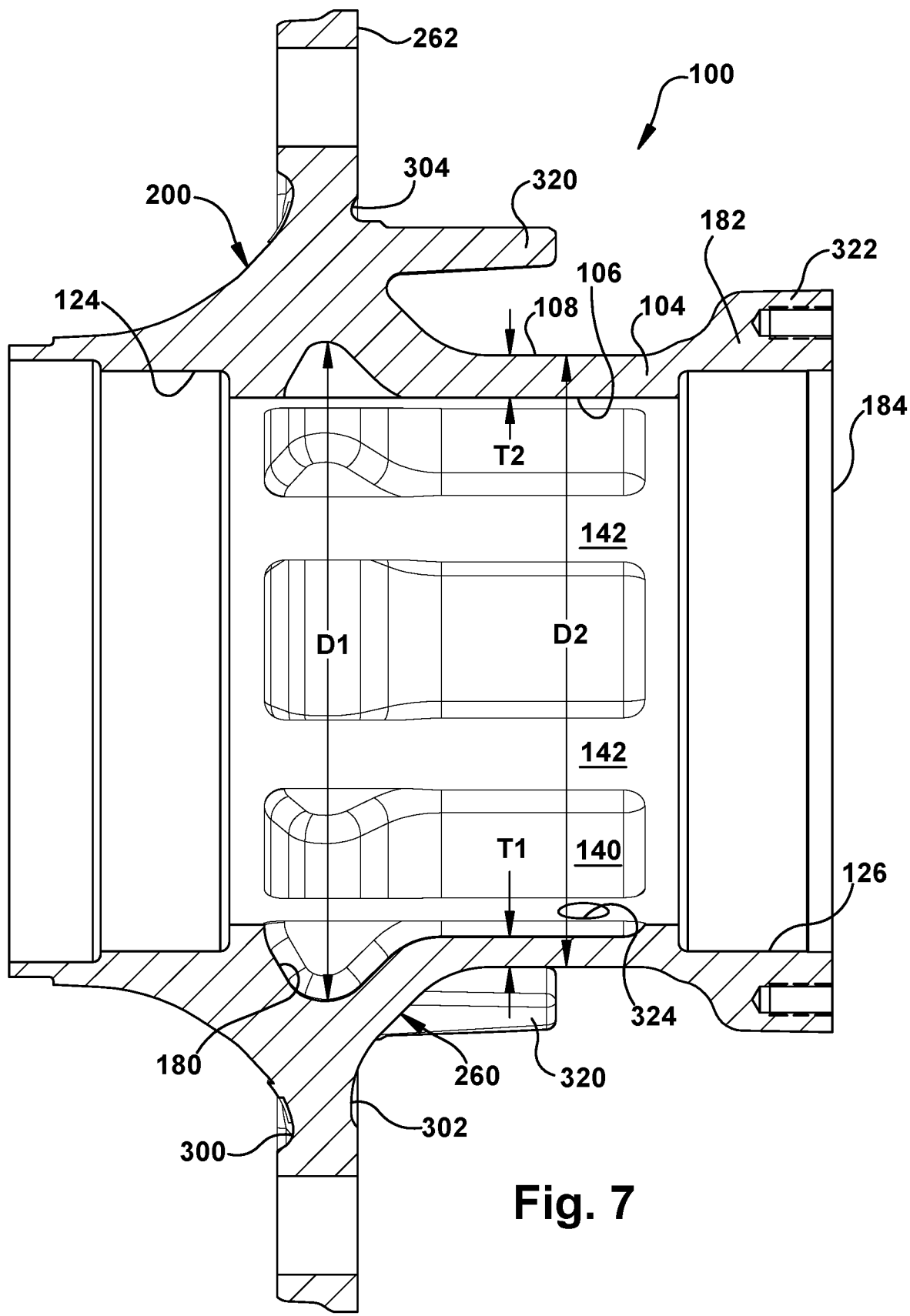
FIG. 7 is an enlarged cross-sectional side view of the hub, similar to FIG. 4.

A reservoir or channel 180 is formed in the cylindrical body 102 and extends from the lubrication chamber 140 in the hub 100. A majority of the volume of the reservoir channel 180 is located radially under the axial extent of the flange 160. The reservoir channel 180 may have a portion with an inner diameter D1 (FIG. 4) that is greater than the outer diameter D2 of the cylindrical outer wall surface 108 of the barrel 104. The reservoir channel 180 provides a volume for additional lubricant to occupy and further lessens the weight of the hub 100 by displacing metal material. Locating the reservoir channel 180 in the area of the flange 160 makes available a relatively large amount of lubrication near the inboard bearing receiving bore 124 where better lubrication is often needed. The reinforcing ribs may axially bridge or span the reservoir channel 180, as illustrated in FIGS. 3, 4 and 7. Each reinforcing rib 142 extends axially between the bearing receiving bores 124, 126 from the reservoir channel 180 to at least the barrel portion 104.

A plurality of circumferentially arranged and spaced apart openings 162 may be formed in the flange 160 of the hub 100. Each of the openings 162 receives a respective wheel mounting stud (not shown) as is known. A brake drum (not shown) and a tire and wheel assembly (not shown) may be mounted against the flange 160 on the wheel mounting studs and retained by tightening nuts (not shown) onto the wheel mounting studs.

The barrel 104 of the hub 100 necks down, or has a slightly smaller outer diameter D2, from the outer diameter D3 of a circumferential envelope 182 that surrounds the outboard bearing receiving bore 126 (FIG. 4). The barrel 104 may have an outer diameter D2 in the range from about 5.95 inches to about 6.25 inches and preferably having an outer diameter of about 6.1 inches. The circumferential envelope 182 has an outer diameter D3 where the hub 100 has no hubcap retaining structure and a thickness T3. The circumferential envelope 182 may have an outer diameter D3 in the range from about 6.25 inches to about 6.55 inches and preferably having an outer diameter of about 6.41 inches. The cylindrical body 102 of the hub 100 has a ratio (D2/D3) of the outer diameter D2 of the barrel 104 to the outer diameter D3 of the circumferential envelope 182 in the range from about 0.92 to about 0.98 and preferably about 0.95. The thickness T3 of the envelope 182 is substantially the same as the thicknesses T1 and T2 of the barrel portion 104.

The barrel 104 and the circumferential envelope 182 have substantially the same thickness T1 in the range from about 0.19 inch to about 0.53 inch and preferably in the range from about 0.25 inch to about 0.35 inch. Thus, the hub 100 has a diameter D3 of the circumferential envelope 182 to the thickness T1 of the circumferential envelope ratio (D3/T1) in the range of about 12 to about 34 and preferably in the range from about 18 to about 24 with the circumferential envelope 182 diameter D3 being about 6.41 inches. Because the barrel 104 and the circumferential envelope 182 of the hub 100 are relatively thin, a hubcap seat flange 184 (FIGS. 2-4 and 6-7) is formed with an outer diameter D4 which is greater than the diameter D3 of the circumferential envelope 182. The outer diameter D4 of the hubcap seat flange 184 may be about 6.67 inches to provide sufficient structure for a hubcap and/or gasket to engage and seal.

The barrel 104 of the hub 100 has a thickness T2 where a reinforcing rib 142 is located that is in the range from about 0.31 inch to about 0.63 inch and preferably in the range from about 0.41 inch to about 0.49 inch. The barrel 104 of the hub 100 has a thickness T1 where a rib is not located that is in the range from about 0.19 inch to about 0.53 inch and preferably in the range from about 0.25 inch to about 0.35 inch. Thus, the hub 100 has an outer diameter D2 of the barrel 104 to the thickness T1 in the barrel ratio (D2/T1) in the range from about 11 to about 32 and preferably in the range from about 17 to about 24 where no rib is present with the barrel having an outside diameter D2 of about 6.1 inches. The hub 100 also has an outer diameter D2 of the barrel 104 to the thickness T2 in the barrel ratio (D2/T2) in the range from about 8 to about 20 and preferably in the range from about 12 to about 15 where a reinforcing rib 142 is present with the barrel having an outside diameter D2 of about 6.1 inches.

Figure 5:
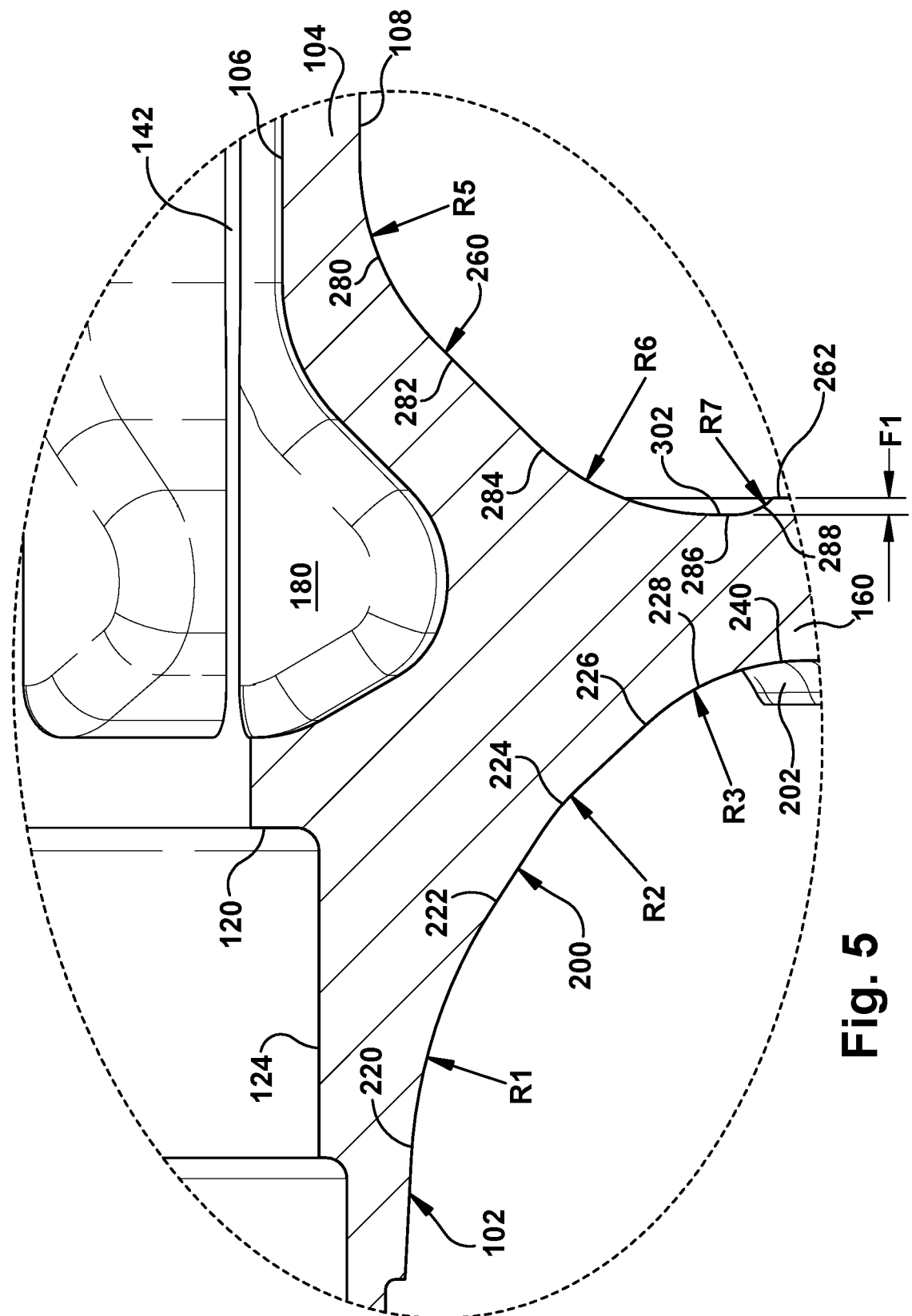
FIG. 5 is an enlarged fragmentary cross-sectional view of the hub illustrated in FIG. 4, taken approximately along a portion indicated by "FIG. 5" in FIG. 4.
Figure 6:
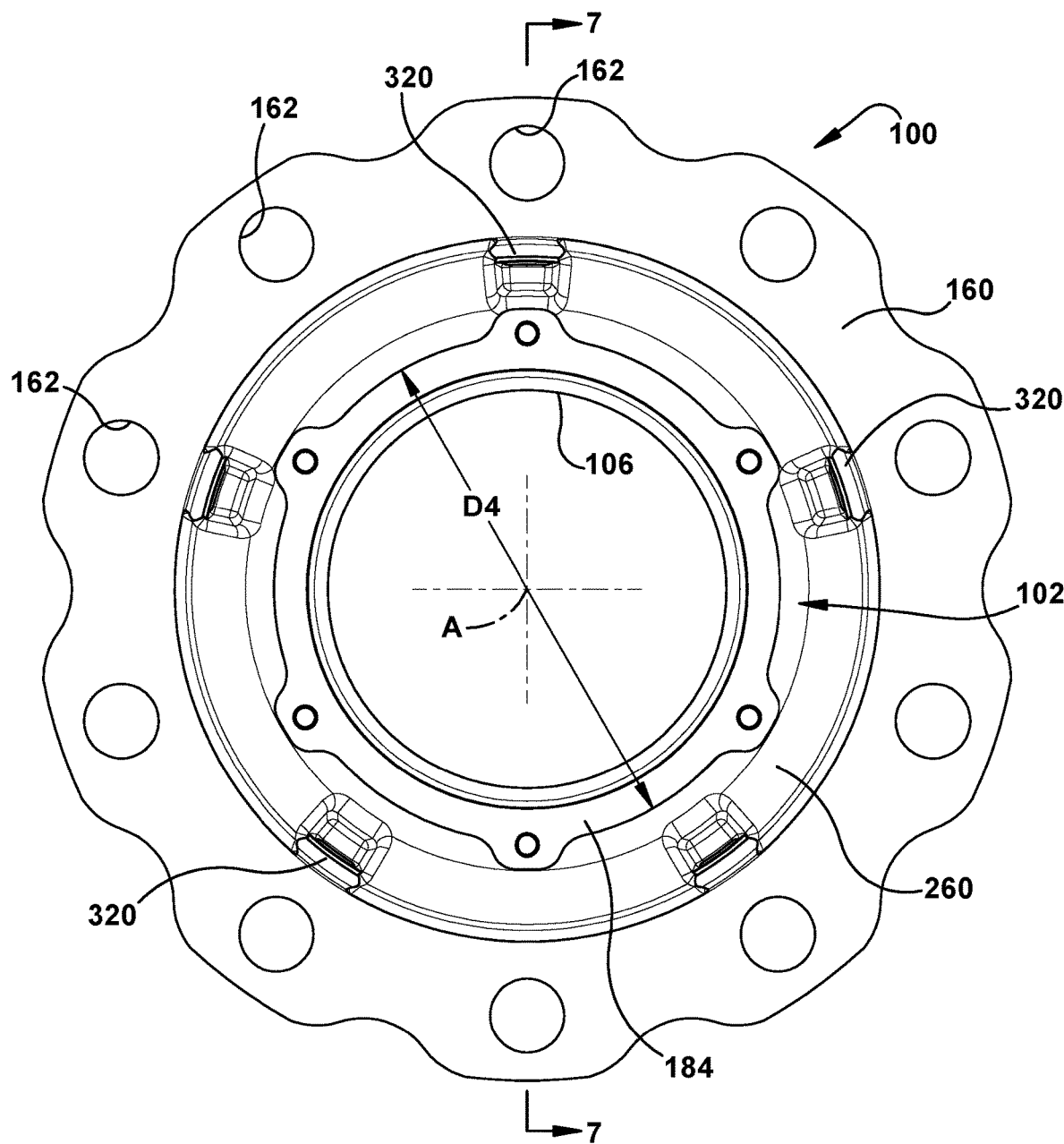
FIG. 6 is a front elevational view of the hub illustrated in FIG. 2, viewed from an outboard side of the hub.

The hub 100 may have an integrally cast first transition segment 200 (FIG. 5) extending between the cylindrical outer wall surface 108 of the cylindrical body 102 and a first or inboard surface 204 (FIG. 4) of the flange 160. The first transition segment 200 may be formed with a specific profile taken in a plane extending radially from the longitudinal central axis A, when viewed as illustrated in FIGS. 4 and 5. The specific profile of the first transition segment 200 may be made up of two flat portions and four radius portions that smoothly transition into a specific pattern or order to avoid undesirable localized stress concentrations. A plurality of circumferentially spaced and radially extending individual stud bosses 202 are provided on the flange 160 of the hub 100 through which the openings 162 are formed. An area between adjacent stud bosses 202 is not needed for structural strength and can be axially thinner than the thickness of the stud bosses or completely absent to reduce overall weight of the hub 100. The individual stud bosses 202 are provided instead of a full continuous ring where the flange 160 has a constant and uniform axially extending thickness. The axial extent or thickness E1 of each stud bosses 202 is less than the axial extent or thickness E2 of the flange 160.

For example, the first transition segment has a first transition portion 220 that may be arcuate with a relatively large radius R1 in the range from about 1.9 inches to about 2.1 inches. A second transition portion 222 extends smoothly from the first transition portion 220, may be straight and extend at an angle in the range from about 30° to about 36° relative to the longitudinal central axis A of the hub 100 for a distance in the range from about 0.30 inch to about 0.39 inch. A third transition portion 224 extends smoothly from the second transition portion 222, and may be arcuate with a radius R2 in the range from about 0.85 inch to about 0.95 inch. A fourth transition portion 226 extends smoothly from the third transition portion 224, may be straight and extend at an angle in the range from about 44° to about 50° relative to the longitudinal central axis A of the hub 100 for a distance in the range from about 0.32 inch to about 0.41 inch. A fifth transition portion 228 extends smoothly from the fourth transition portion 226, and may be arcuate with a radius R3 in the range from about 0.85 inch to about 0.95 inch. A sixth transition portion 240 extends smoothly from the fifth transition portion 228, may be straight and extend at an angle in the range from about 85° to about 95° relative to the longitudinal central axis A of the hub 100 for a distance in the range from about 0.08 inch to about 0.12 inch before blending smoothly into the area between adjacent stud bosses 202. All of the transition portions of the first transition segment 200 blend smoothly with adjacent transition portions.

The hub 100 may have an integrally cast second transition segment 260 extending between the cylindrical outer wall surface 108 and a second or outboard surface 262 of the flange 160. The second surface 262 of the flange 160 is on an opposite side of the flange from the first surface 204 and the stud bosses 202. The second transition segment 260 may also be formed with a specific profile taken in a plane extending radially from the longitudinal central axis A, when viewed as illustrated in FIGS. 4-5. The specific profile of the second transition segment 260 may be made up of two flat portions and three radius portions that smoothly transition into a specific pattern or order to avoid undesirable localized stress concentrations.

For example, a first transition portion 280 may be arcuate with a radius R5 in the range from about 0.90 inch to about 1.10 inches. A second transition portion 282 extends smoothly from the first transition portion 280, may be straight and extend at an angle in the range from about 40° to about 50° relative to the longitudinal central axis A of the hub 100 for a distance in the range from about 0.48 inch to about 0.58 inch. A third transition portion 284 extends smoothly from the second transition portion 282 and may be arcuate with a radius R6 in the range from about 0.90 inch to about 1.10 inches. A fourth transition portion 286 extends smoothly from the third transition portion 284, may be straight and extend at an angle in the range from about 85° to about 95° relative to the longitudinal central axis A of the hub 100 for a distance in the range from about 0.06 inch to about 0.10 inch. A fifth transition portion 288 extends smoothly from the fourth transition portion 286, and may be arcuate with a relatively small radius R7 in the range from about 0.15 inch to about 0.25 inch. All of the transition portions of the second transition segment 260 blend smoothly with adjacent transition portions.

The transition portion 288 of the second transition segment 260 may extend axially inward of the surface 262 of the flange 160 to form a relief 302 in the flange. The relief 302 in the second transition segment 260 may extend axially into the flange 160 from the outboard surface 262 a distance F1. The distance F1 may be any suitable distance for the relief 302. The relief 302 serves to require less material used in casting the hub 100 to further lighten the hub. A relief 300 may be formed in the first transition segment 200 or the flange 160 near where they blend together (FIG. 7).

The hub 100 may have a plurality of brake drum and wheel mounting pilots 320 spaced from the barrel 104. The inner surface of the mounting pilots 320 may be spaced from the outer surface of the barrel 104 about 0.6 inch. The mounting pilots 320 are evenly and circumferentially spaced apart the flange 160 and second transition segment 260 of the hub 100 to facilitate proper alignment of a brake drum, if any, and the wheel rim on the hub. While five mounting pilots 320 are shown, any suitable number of mounting pilots may be employed. When a drum brake is employed with hub 100, the pilots 320 are needed in order to accurately position a brake drum and the wheel rim on the outboard surface 262 of the flange 160 to ensure proper alignment and operation of brake components and the wheel end assembly relative to the longitudinal central axis A of the hub. The relief 302 advantageously reduces stress in the second transition segment 260. It will be apparent that the illustrated hub 100 is intended for use in wheel end assemblies with drum braking systems. With some modification to the geometry of the hub 100, it may be employed in wheel end assemblies with air disc braking systems. The hub 100 may also have mounting structure 322 for a hubcap (not shown) formed in the circumferential envelope 182 of the cylindrical body 102. There may also be another relief 304 located radially outward of each mounting pilot 320 to reduce stress at the base of the pilots 320. Each of the reliefs 304 extend axially into the flange 160 and is located adjacent the intersection of the flange and the mounting pilot 320.

The hub 100 may have an opening 324 (FIGS. 2-4) formed in the barrel 104 and through a reinforcing rib 142, or in the alternative have a boss (not shown) extending from the cylindrical inner wall surface 106 or the cylindrical outer wall surface 108. The opening 324 or boss offers an area for lubrication fill structure (not shown) to be threaded into and does not require a separate built-up or thicker area in the casting of the hub 100 which would add weight.

Hub 100 reduces weight by employing a structure that utilizes less material. In this manner, hub 100 includes a relatively thinner wall thickness T1, T2 when compared to the wall thickness TP1, TP2, respectively, of the prior art hub 20. Furthermore, the area between adjacent stud bosses 202 can be axially thinner than the thickness of the stud bosses themselves or completely absent to reduce overall weight of the hub 100. Such a construction employs less material used for casting the hub 100, which optimizes the strength-to-weight ratio of hub 100, and reduces the weight and cost of the hub when compared to the prior art hub 20. By casting the hub 100, the amount of material needed to form the hub is reduced which desirably reduces the cost associated with forming the hub.

The hub 100 weighs in the range of about 88% to about 92% of what some known prior art hubs weigh while meeting all the performance requirements as the prior art hubs. Thus, less weight results in more cargo that can be carried in the heavy-duty vehicle.

The use of a relatively thin barrel 104 with at least one of the profiled first and second transition segments 200, 260, respectively, enables less severe and rapid changing section modulus between the flange 160 and the barrel at the first and/or second transition segments, which improves the strength and fatigue life of the hub 100. Moreover, casting the hub 100 enables first and second transition segments 200, 260 between the flange 160 and the barrel 104 to be formed with a gentle, smooth transition profile, which in turn provides less severe and rapid changing section modulus. The hub 100 has a less rapid section modulus change. Such a less rapid section modulus change reduces the stress in the transition segments 200, 260 and improves the fatigue strength of hub 100 when compared to prior art hub 20. In this manner, the hub 100 provides a structure that optimizes the performance characteristics and properties of the hub, such as the strength-to-weight ratio of the hub while minimizing the amount of material needed to form the hub.

By employing the barrel 104 with the reservoir channel 180 extending radially under the flange 160, the size of lubrication chamber 140 is increased, which provides the hub 100 with the ability to provide sufficient lubrication to the bearings when the lubrication chamber is properly filled. The reservoir channel 180 also displaces material used to cast the hub 100, therefore further reducing weight and cost to manufacture the hub 100. It is noted that the barrel 104 essentially extends from the reservoir channel 180 to near the outboard bearing receiving bore 126. By the inner surfaces of the mounting pilots 320 being spaced from the outer surface of the barrel 104, there is no material that is used to provide reinforcement for the mounting pilots and, thus, weight is saved.

The above-described construction of the cast hub 100 provides a hub that is lighter in weight, more economical to manufacture, and exhibits improved physical characteristics and properties when compared to the prior art hub 20. The cast hub 100 maximizes strength and minimizes weight by incorporating specific longitudinal cross-section profiles along with ratios and/or relationships of various diameters D2, D3 with each other and to certain thicknesses T1, T2 of the walls of the barrel 104. The cast hub 100 also provides a sufficiently strong structure that contains relatively less of the expensive lubrication material when compared to the prior art hub 20.

The disclosed subject matter successfully incorporates a relatively lightweight one-piece integrally cast hub 100 into a wheel end assembly for heavy-duty vehicles. More particularly, the hub 100 minimizes the amount of raw material employed to form the hub when compared to prior art hub 20, which decreases the cost of forming the hub. The hub 100 has an optimized strength-to-weight ratio to improve certain performance characteristics and properties such as increased fatigue life, enabling the hub to be lighter in weight, to include an improved strength-to-weight ratio, and desirably reducing the cost of the hub.

It is to be understood that the structure of the hub 100 may be altered or rearranged, or certain components omitted or added, without affecting the overall concept or operation of the disclosed subject matter. In addition, it is to be understood that materials other than those described above may be employed for the hub 100 without affecting the overall concept or operation of the invention. It is also to be understood that the hub 100 finds application in all types of known heavy-duty vehicles.

The present invention has been described with reference to a specific aspect. Certain terms have been used for brevity, clarity and understanding, but no unnecessary limitations are to be implied beyond the requirements of the prior art, because such terms are used for descriptive purposes and are intended to be broadly construed. It is understood that this description and illustration is by way of example and not by way of limitation. Potential modifications and alterations will occur to others upon a reading and understanding of this disclosure, and it is understood that the disclosed subject matter and claims include all such modifications and alterations and equivalents.

What is claimed is:

1. A hub for a heavy-duty vehicle and for mounting a wheel for relative rotation, the hub comprising:
   a substantially cylindrical body having axially opposite end portions and a longitudinal central axis, the cylindrical body defining a lubrication chamber;
   a pair of bearing receiving bores formed in the cylindrical body, each one of the pair of bearing receiving bores being located at a respective axially opposite end portion of the cylindrical body;
   a flange extending radially outward from the cylindrical body at a location between the pair of bearing receiving bores in the cylindrical body, the flange being defined axially by an axial extent;
   a barrel portion of the cylindrical body extending between the flange and one of the pair of bearing receiving bores, the barrel portion having an outer diameter; and
   a reservoir channel formed in the cylindrical body and extending from the lubrication chamber, the reservoir channel being defined axially by an axial extent and being substantially radially aligned with the axial extent of the flange, the reservoir channel having an inner diameter greater than an outer diameter of the barrel portion of the cylindrical body.

2. The hub of claim 1 further including:
   a first transition segment located between the flange and the cylindrical body, the first transition segment extending in a direction towards a first axial end of the cylindrical body;
   a second transition segment between the flange and the cylindrical body, the second transition segment extending in a direction towards an opposite second axial end of the cylindrical body; and
   at least one of the first and second transition segments having a profile taken in a plane extending radially from the longitudinal central axis of the cylindrical body, the profile includes at least one arcuate portion and at least one straight portion.

3. The hub of claim 2 wherein both of the first and second transition segments have profiles including at least one arcuate portion and at least one straight portion.

4. The hub of claim 2 wherein a profile of at least one of the first and second transition segments includes at least two arcuate portions and at least one straight portion in which the at least one straight portion is located between arcuate portions.

5. The hub of claim 2 wherein the profile of at least one of the first and second transition segments includes an arcuate first transition portion extending from the cylindrical body in a direction from the first axial end of the cylindrical body and having a radius in a range from 1.9 inches to 2.1 inches and a straight second transition portion extending from the first transition portion at an angle in a range from 30° to 36° relative to the longitudinal central axis of the cylindrical body for a distance in the range from 0.30 inch to 0.39 inch.

6. The hub of claim 5 further including the cylindrical body having a plurality of reinforcing ribs bridging the reservoir channel to the first arcuate transition of the second transition segment.

7. The hub of claim 2 wherein the profile of at least one of the first and second transition segments includes an arcuate first transition portion extending from the cylindrical body in a direction from the opposite second axial end of the cylindrical body and having a radius in a range from 0.90 inch to 1.10 inches and a straight second transition portion extending from the first transition portion at an angle in the range from 40° to 50° relative to the longitudinal central axis of the cylindrical body for a distance in a range from 0.48 inches to 0.58 inches.

8. The hub of claim 2 further including mounting pilots having a relief extending axially into the flange and being located adjacent the intersection of the flange and each mounting pilot and another relief extending axially into the flange and being located adjacent the flange and one of the first and second transition segments.

9. The hub of claim 1 further including a circumferential envelope having an outer diameter being formed on the cylindrical body about one of the pair of bearing receiving bores and the cylindrical body having a ratio of the outer diameter of the barrel to the outer diameter of the circumferential envelope in a range from 0.92 to 0.98.

10. The hub of claim 1 further including an envelope located around a bearing receiving bore portion having an envelope diameter, the barrel portion extending between the flange and the envelope, and the barrel portion having a thickness, wherein a ratio of the envelope diameter or barrel diameter to the thickness of the barrel portion is in a range from 11 to 34.

11. The hub of claim 1 further including a circumferential envelope around a bearing receiving bore portion having an envelope thickness, the barrel portion having a barrel thickness, wherein the envelope thickness being substantially the same as the barrel thickness.

12. The hub of claim 1 further including the cylindrical body having multiple reinforcing ribs and a thickness at the location of each reinforcing rib, wherein a ratio of outer diameter of the barrel portion to the thickness of the reinforcing ribs is in a range from 8 to 20.

13. The hub of claim 1 further including the cylindrical body having a plurality of reinforcing ribs extending between the bearing receiving bores and bridging the reservoir channel.

14. The hub of claim 1 further including a plurality of axially extending and circumferentially spaced stud bosses formed in the flange and wherein the axial extent of each stud boss being greater than the axial thickness of the flange.

15. A hub for a heavy-duty vehicle and for mounting a wheel for relative rotation, the hub comprising:
   a substantially cylindrical body having axially opposite end portions and a longitudinal central axis;
   a pair of bearing receiving bores formed in the cylindrical body, each one of the pair of bearing receiving bores being located at a respective axially opposite end portion of the cylindrical body;
   a circumferential envelope located about one of the pair of bearing receiving bores, the circumferential envelope having an outer diameter formed on the cylindrical body;
   a flange extending radially outward from the cylindrical body at a location between the pair of bearing receiving bores;
   a barrel portion of the cylindrical body extending between the flange and the circumferential envelope, the barrel portion having an outer diameter over an axial extent; and
   a ratio of the outer diameter for the entire axial extent of the barrel portion to the maximum outer diameter of the circumferential envelope being in a range from 0.92 to 0.98.

16. The hub of claim 15 further including:
   a first transition segment located between the flange and the cylindrical body, the first transition segment extending in a direction towards a first axial end of the cylindrical body;
   a second transition segment between the flange and the cylindrical body, the second transition segment extending in a direction towards an opposite second axial end of the cylindrical body; and
   at least one of the first and second transition segments having a profile taken in a plane extending radially from the longitudinal central axis of the cylindrical body, the profile includes at least one arcuate portion and at least one straight portion.

17. The hub of claim 16 wherein both of the first and second transition segments have profiles including at least one arcuate portion and at least one straight portion.

18. The hub of claim 16 wherein a profile of at least one of the first and second transition segments includes at least two arcuate portions and at least one straight portion in which the at least one straight portion is located between arcuate portions.

19. The hub of claim 16 further including a reservoir channel formed in the cylindrical body extending from a lubrication chamber, the reservoir channel is defined axially by an axial extent and is substantially radially aligned with an axial extent of the flange, the reservoir channel having an inner diameter greater than the outer diameter of the barrel portion of the cylindrical body.

20. The hub of claim 19 further including the cylindrical body having a plurality of reinforcing ribs bridging the reservoir channel to a first arcuate transition of the second transition segment.

21. The hub of claim 19 further including the cylindrical body having a plurality of reinforcing ribs extending between the bearing receiving bores and bridging the reservoir channel.

22. The hub of claim 15 wherein the barrel portion of the barrel portion of the cylindrical body having a thickness, wherein a ratio of the envelope outer diameter or barrel portion diameter to the thickness of the barrel portion is in a range from 11 to 34.

23. The hub of claim 15 wherein the circumferential envelope having an envelope thickness, the barrel portion having a barrel thickness, and the envelope thickness being substantially the same as the barrel thickness.

24. The hub of claim 15 further including a barrel with a barrel diameter and the cylindrical body having a rib with a thickness, wherein a ratio of barrel diameter to the thickness of the rib is in a range from 8 to 20.

25. The hub of claim 15 further including a plurality of axially extending and circumferentially spaced mounting pilots located adjacent one of the first and second transition segments and the flange, each of the mounting pilots having a relief extending axially into the flange and being located adjacent the intersection of the flange and the mounting pilot.

26. The hub of claim 15 further including a plurality of axially extending and circumferentially spaced stud bosses formed in the flange and wherein the axial extent of each stud boss being greater than an axial thickness of the flange.

27. A hub for a heavy-duty vehicle and for mounting a wheel for relative rotation, the hub comprising:
   a substantially cylindrical body having axially opposite end portions and a longitudinal central axis, the cylindrical body defining a lubrication chamber;
   a pair of bearing receiving bores formed in the cylindrical body, each one of the pair of bearing receiving bores being located at a respective axially opposite end portion of the cylindrical body;
   a flange extending radially outward from the cylindrical body at a location between the pair of bearing receiving bores in the cylindrical body;
   a barrel portion of the cylindrical body extending between the flange and one of the pair of bearing receiving bores, the barrel portion having an outer diameter;
   a plurality of circumferentially spaced mounting pilots, each of the mounting pilots spaced from the barrel portion of the cylindrical body;
   a reservoir channel formed in the cylindrical body extending from the lubrication chamber and at least partially located radially inward of the flange, the reservoir channel having an inner diameter greater than an outer diameter of the barrel portion of the cylindrical body;
   a first transition segment located between the flange and the cylindrical body, the first transition segment extending in a direction towards a first axial end of the cylindrical body;
   a second transition segment between the flange and the cylindrical body, the second transition segment extending in a direction towards an opposite second axial end of the cylindrical body;
   at least one of the first and second transition segments having a profile taken in a plane extending radially from the longitudinal central axis of the cylindrical body, the profile includes at least one arcuate portion and at least one straight portion; and
   the profile of at least one of the first and second transition segments includes an arcuate first transition portion extending from the cylindrical body in a direction from the first axial end of the cylindrical body and having a radius in a range from 1.9 inches to 2.1 inches and a straight second transition portion extending from the first transition portion at an angle in a range from 30° to 36° relative to the longitudinal central axis of the cylindrical body for a distance in the range from 0.30 inch to 0.39 inch.

28. A hub for a heavy-duty vehicle and for mounting a wheel for relative rotation, the hub comprising:
a substantially cylindrical body having axially opposite end portions and a longitudinal central axis, the cylindrical body defining a lubrication chamber;
a pair of bearing receiving bores formed in the cylindrical body, each one of the pair of bearing receiving bores being located at a respective axially opposite end portion of the cylindrical body;
a flange extending radially outward from the cylindrical body at a location between the pair of bearing receiving bores in the cylindrical body;
a barrel portion of the cylindrical body extending between the flange and one of the pair of bearing receiving bores, the barrel portion having an outer diameter;
a plurality of circumferentially spaced mounting pilots, each of the mounting pilots spaced from the barrel portion of the cylindrical body;
a reservoir channel formed in the cylindrical body extending from the lubrication chamber and at least partially located radially inward of the flange, the reservoir channel having an inner diameter greater than an outer diameter of the barrel portion of the cylindrical body;
a first transition segment located between the flange and the cylindrical body, the first transition segment extending in a direction towards a first axial end of the cylindrical body;
a second transition segment between the flange and the cylindrical body, the second transition segment extending in a direction towards an opposite second axial end of the cylindrical body;
at least one of the first and second transition segments having a profile taken in a plane extending radially from the longitudinal central axis of the cylindrical body, the profile includes at least one arcuate portion and at least one straight portion; and
the profile of at least one of the first and second transition segments includes an arcuate first transition portion extending from the cylindrical body in a direction from the opposite second axial end of the cylindrical body and having a radius in a range from 0.90 inch to 1.10 inches and a straight second transition portion extending from the first transition portion at an angle in the range from 40° to 50° relative to the longitudinal central axis of the cylindrical body for a distance in a range from 0.48 inch to 0.58 inch.

29. A hub for a heavy-duty vehicle and for mounting a wheel for relative rotation, the hub comprising:
a substantially cylindrical body having axially opposite end portions and a longitudinal central axis, the cylindrical body defining a lubrication chamber;
a pair of bearing receiving bores formed in the cylindrical body, each one of the pair of bearing receiving bores being located at a respective axially opposite end portion of the cylindrical body;
a flange extending radially outward from the cylindrical body at a location between the pair of bearing receiving bores in the cylindrical body;
a barrel portion of the cylindrical body extending between the flange and one of the pair of bearing receiving bores, the barrel portion having an outer diameter;
a plurality of circumferentially spaced mounting pilots, each of the mounting pilots spaced from the barrel portion of the cylindrical body;
a reservoir channel formed in the cylindrical body extending from the lubrication chamber and at least partially located radially inward of the flange, the reservoir channel having an inner diameter greater than an outer diameter of the barrel portion of the cylindrical body; and
the cylindrical body having multiple reinforcing ribs and a thickness at the location of each reinforcing rib, wherein a ratio of outer diameter of the barrel portion to the thickness of the reinforcing ribs is in a range from 8 to 20.

30. A hub for a heavy-duty vehicle and for mounting a wheel for relative rotation, the hub comprising:
a substantially cylindrical body having axially opposite end portions and a longitudinal central axis;
a pair of bearing receiving bores formed in the cylindrical body, each one of the pair of bearing receiving bores being located at a respective axially opposite end portion of the cylindrical body;
a circumferential envelope located about one of the pair of bearing receiving bores, the circumferential envelope having an outer diameter formed on the cylindrical body;
a flange extending radially outward from the cylindrical body at a location between the pair of bearing receiving bores;
a barrel portion of the cylindrical body extending between the flange and the circumferential envelope, the barrel portion having an outer diameter over an axial extent;
a ratio of the outer diameter for the entire axial extent of the barrel portion to the outer diameter of the circumferential envelope being in a range from 0.92 to 0.98; and
a reinforcing rib in the barrel portion, the reinforcing rib having a thickness, wherein a ratio of the outer diameter of barrel portion to the thickness of the reinforcing rib being in a range from 8 to 20.

* * * * *